United States Patent [19]
Quinlan

[11] 3,873,215

[45] Mar. 25, 1975

[54] RADIOMETER

[75] Inventor: Kenneth P. Quinlan, Newton, Mass.

[73] Assignee: The United States of America as represented by the Secretary of the United States Air Force, Washington, D.C.

[22] Filed: Sept. 20, 1973

[21] Appl. No.: 399,011

[52] U.S. Cl............. 356/218, 250/211 R, 250/472, 250/473, 260/396 R
[51] Int. Cl. ......................... G01j 1/42, C07c 49/62
[58] Field of Search........ 250/211 R, 212, 472, 473; 356/218; 260/396 R; 324/30 R

[56] References Cited
UNITED STATES PATENTS 2,483,299  9/1949  Paully ............................. 324/30 R
2,700,736  1/1955  Roberts............................ 250/473

Primary Examiner—James W. Lawrence
Assistant Examiner—T. N. Grigsby
Attorney, Agent, or Firm—Harry A. Herbert, Jr.; William J. O'Brien

[57] ABSTRACT

A radiometer for detecting and measuring radiant electromagnetic energy which comprises a pH meter in combination with a light sensitive porphyrin-quinone solution. Chlorophyl a and b, pheophytin, hematoporphyrin, bacteriochlorophyll, and zinc tetraphenylporphin can be utilized as the porphyrin component while hydroquininone and benzoquininone can be employed as the quinone component.

4 Claims, 4 Drawing Figures

RADIOMETER

BACKGROUND OF THE INVENTION

This invention relates to a radiometer. More particularly, this invention concerns itself with a system for detecting and measuring radiant electromagnetic energy.

The detection and measurement of radiant energy in the visible and infrared range is an important research aid and finds many technical applications in the testing of new products and procedures. Generally, the devices used in radiometry can be used to measure visible light, but are more often concerned with measuring radiation in the infrared range. Radiometers which are applicable in measuring both visible and infrared radiation over a wide range are relatively scarce and quite expensive. Attempts by those skilled in the art to construct an economical device that is sensitive to a wide range of wavelengths has not proven too successful.

With this invention, however, it has been found that a low cost system can be made that still achieves a high degree of efficiency in measuring radiation at wavelengths which can be varied over a wide range from the visible at about 250 $\mu$ to the infrared at about 10,000 $\mu$.

SUMMARY OF THE INVENTION

In accordance with this invention, it has been found that certain light sensitive porphyrin-quinone solutions eject protons and uptake protons when illuminated. The amount of uptake or ejected is proportional to the light intensity with constant porphyrin concentration. The wavelength can be varied over a wide range which depends on the absorption characteristic of the porphyron. When the light sensitive porphyrin-quinone solution is exposed to light, protons are ejected into the surrounding media. The number of protons ejected is measured by a conventional pH meter which can then be correlated to the amount of light projected into the light sensitive solution. Combining the light sensitive solution with a conventional pH meter provides a novel system that can be used to detect and measure the intensity of visible and infrared radiation.

Accordingly, the primary object of this invention is to provide a system for detecting and measuring radiant electromagnetic radiation.

Another object of this invention is to provide a system which is capable of detecting and measuring radiant energy at wavelengths which can vary over a wide range from the visible to infrared.

Still another object of this invention is to provide a system for detecting and measuring radiant energy that is easy and economical to produce from conventional and currently available materials that lend themselves to standard mass production manufacturing techniques.

The above and still other objects and advantages of the present invention will become readily apparent upon consideration of the following detailed description thereof when taken in conjunction with the accompanying drawings.

DESCRIPTION OF THE PREFERRED EMBODIMENTS

Figure 1:
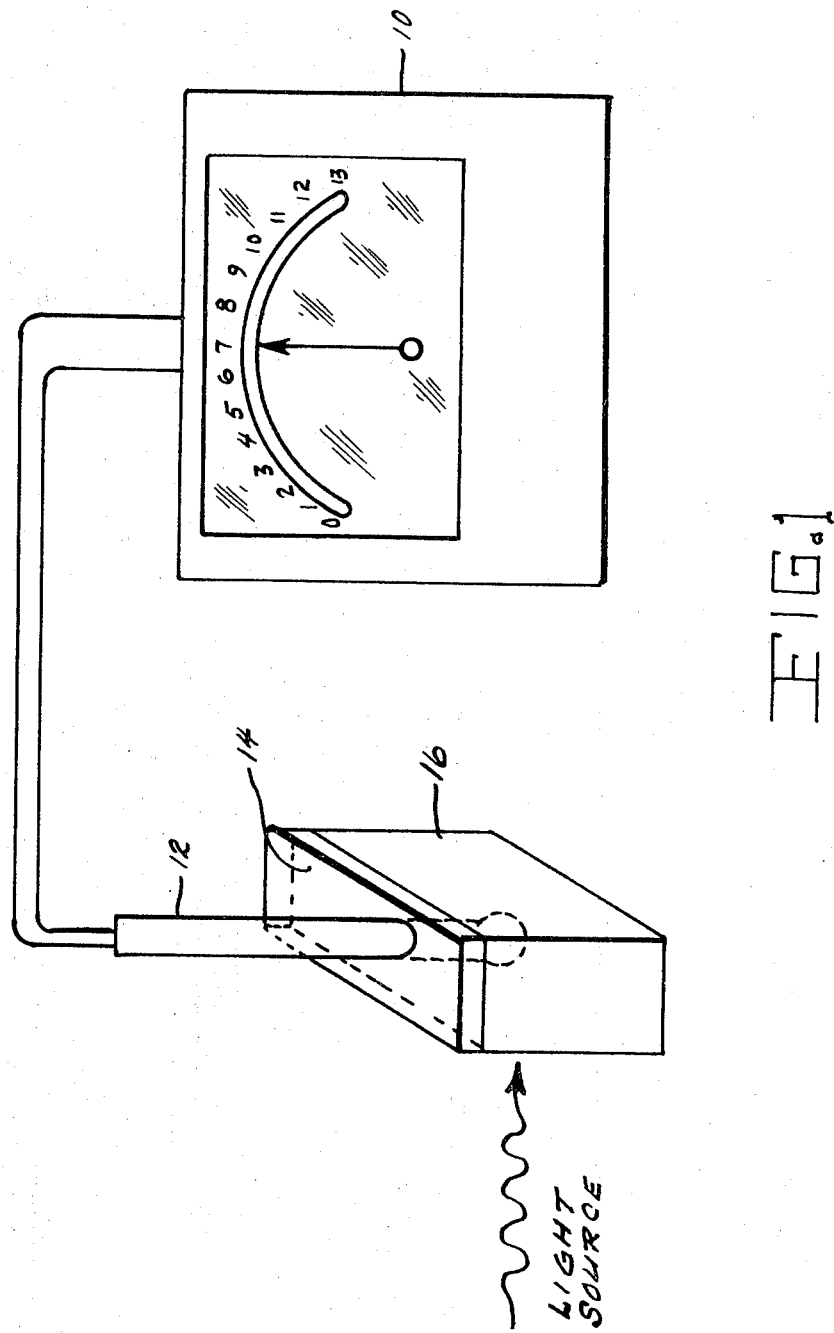
FIG. 1 represents a schematic illustration of the radiant energy detecting and measuring system of this invention.

With reference to the drawings which best illustrate the detection system of this invention, there is shown in FIG. 1 a conventional pH assembly 10 having a glass electrode 12 immersed in a light sensitive porphyrin-quinone solution 14 which in turn is disposed within a suitable transparent container 16. The container 16 may be fabricated from glass or a suitable plastic material such as methyl methacrylate. A light source, not shown in detail, is positioned to illuminate solution 14. When the solution 14 is irradiated with either visible or infrared light, protons are ejected into the solution. The number of protons ejected is proportional to the light intensity with a constant porphyrin concentration. The particular wavelength of light which can be detected varies over a wide range and depends on the absorption characteristic of the particular porphyrin employed in the light sensitive solution 14.

Many porphyrins can be used as a component of the solution 14. Chlorophyll a, chlorophyll b, pheophytin, bacteriochlorophyll and zinc tetraphenylporphin have been found to be especially useful. Hydroquinone and benzoquinone have been found useful as the quinone component. Hydroquinone gives greater responses. With the use of benzoquinone, air can be present but air must be absent when using hydroquinone as the quinone component. The porphyrin concentration is usually in the range of about $10^{-2}$ to $10^{-5}$ moles while the quinone concentration is generally in the range of about $10^{-2}$ to $10^{-4}$ moles. In the system of this invention, the solvents used to make the light sensitive porphyrin solution were either methanol or ethanol. Other conventional solvents would also be useful depending on the solubility of the porphyrins and the quinones.

Figure 2:
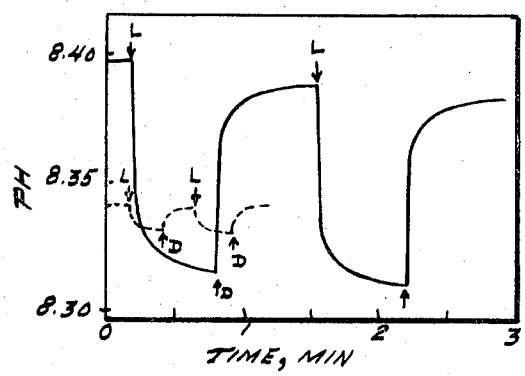
FIG. 2, 3 and 4 represents graphical illustrations showing various test results produced by the system of this invention.
Figure 3:
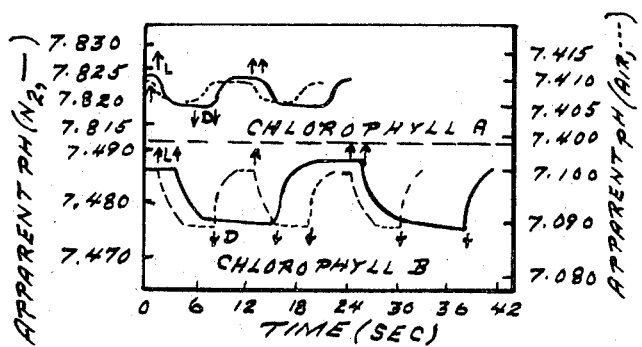
Figure 4:
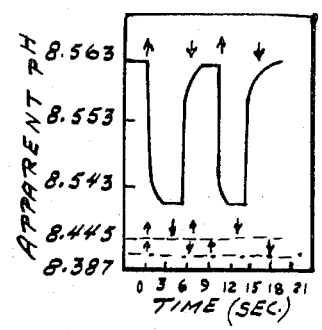

To further illustrate the system of this invention and its method of operation, reference is now made to FIGS. 2, 3 and 4 of the drawings. FIG. 2 discloses the ejection of protons from a chlorophyll a hydroquinone solution in methanol (Chlorophyl a, 2.3 × $10^{-5}$M; hydroquinone, 0.03M). The ordinate in the graph represents pH meter readings. The downward arrow reprsents light on; upward, light off. The solid line in $N_2$; the dotted line in $O_2$.

The chlorophyll a undergoes a light-induced one electron transfer reaction with hydroquinone. In alcoholic solutions, the dissociated p-benzosemiquinone radical ion is formed in this reaction. The data in FIG. 2 shows that protons are ejected into the surrounding media during this light-activated electron transfer. The chlorophyll a and b were prepared by the method of Zscheile and Comar. Hydroquinone (Merk) was purified by recrystallization from benzene. All studies were carried out in 'Baker Analyzed' Reagent spectrophotometric grade methanol. The apparent pH values of the solutions were recorded during the light and dark intervals by means of the system shown in FIG. 1. Calibration of the setup showed that the response was linear within the range of measurements made in the present study. The solutions were irradiated with a 1 kW projection lamp setup consisting of a collimating lens, a Corning S2-61 filter, a 1 cm heat filter of 0.05 percent copper sulfate, and a 5 cm filter of distilled water. The light intensity was $2.02 \times 10^6$ erg/cm$^2$/sec. as measured with an Eppley thermopile. In the air-free experiments, the test solutions were flushed with nitrogen which was passed through solutions of chromous chloride and methanol. Test solutions were kept in a nitrogen atmosphere during irradiation.

The evidence of proton ejection during electron transfer between hydroquinone and chlorophyll $a$ in the absence of air is shown by the solid line in FIG. 2. The data represents typical results obtained after a series of light and dark intervals. Chlorophyll $b$ shows similar change. Irradiation of chlorophyll $a$ or $b$ alone in methanol gives a slight alkaline reaction. The pH decrease in the presence of hydroquinone is due to the dissociation of the hydroquinone radical formed by a light-induced single electron transfer to the triplet state of chlorophyll. Both radicals of the hydroquinone $AH_2$, $QH_2 1+$ and $QH\cdot$, are known to have low pK values. The presence of the dissociated p-benzosemiquinone radical ion, $Q^-$, has been amply substantiated by ESR measurements on these solutions. The rate of the pH decrease is slower than that of the rapid rise of the ESR signals. This is attributed to the slow response of the electrode system to the pH change of these photochemical systems as found in the slow change of their redox-potential.

When the solution was flushed with oxygen for 15 min., the change of pH was substantially decreased as shown by the dashed line in FIG. 2. The large pH change which is not seen in the presence of oxygen reappears when the solutions are again flushed with nitrogen. It is well known that oxygen is capable of quenching both the excited singlet and triplet state of chlorophyll. The effect of oxygen on the pH change can best be explained by the competing reactions of oxygen and hydroquinone for the excited states of chlorophyll, thereby inhibiting the reaction between hydroquinone and triplet state of chlorophyll. This is also shown by the inhibitory effect of oxygen on the initial production of p-benzosemiquinone radical ion which is accompanied by the appearance of chlorophyll-oxygen radical.

FIG. 3 shows the ejection of protons from chlorophyll —p— benzoquinone systems in methanol. Right ordinate represents results obtained in air. The upward arrows represent light on; downward, light off. Top figure: chlorophyll $a$, $3.7 \times 10^{-5}$M: with quinone, 0.03M. Bottom figure: chlorophyll $b$, $2.3 \times 10^{-5}$M; with quinone, 0.03M.

The apparatus of FIG. 1 was used to measure the proton ejection in FIG. 3. A Corning S2-61 filter, which is opaque to all wavelengths below 600 $\mu$, was used. Chlorophylls $a$ and $b$ were prepared by the method of Zxcheile and Comar. p-Benzoquinone was purified by sublimation, p-chloranil was recrystallized from acetone, dimethylformamide was distilled under vacuum from calcium hydride, and the methanol used was the spectrophotometric grade (Fisher). Benzoquinone in alcohol slowly forms a species which absorbs at 355 $\mu$. Since this species is not formed in either dimethylformamide or with chloranil, it is assumed to have little or no effect on the final reslust presented.

FIG. 3 shows the apparent proton ejection from both the chlorophyll $a$- and $b$-quinone systems in methanol. Solutions were deaerated by flushing with nitrogen pretreated with a chromous chloride solution. The dashed line illustrates results obtained after the air-free solutions were exposed to air for at least 0.5 hr. These are typical results obtained in a series of light and dark intervals. Irradiation of the chlorophylls alone in methanol in the presence of air gives irreversible-alkaline reactions which are probably due to the basicity of the products from the photooxidation of the chlorophylls. Air-free systems of chlorophyll $b$ give no pH response but a slight alkaline reaction is obtained with chlorophyll $a$. This may be due to residual oxygen present in the system. Studies of the chlorophyll b-p-chloranil system in methanol showed that more protons are ejected than observed with benzoquinone. The apparent proton ejection activity is in the range of $10^{-6}$M. Proton ejection has also been observed with the quinone systems of pheophytin, bacteriochlorophyll, and hematoporphyria.

FIG. 4 shows Proton ejection from a zinc tetraphenylporphin —p—benzoquinone system in aerated methanol (upward arrows represent light on; downward arrows represent light off): —, zinc tetraphenylporphin ($2.88 \times 10^{-5}$M) and p-benzoquinone ($6.6 \times 10^{-3}$M); —.—.—., ZnTPP ($2.88 \times 10^{-5}$M); — — — —, quinone ($1.4 \times 10^{-3}$M).

The apparatus of FIG. 1 was used to measure the apparent pH values.

The zinc $\alpha,\beta,\gamma$, o-tetraphenylporphin was purified by chromatography on a column of a mixture of magnesia and Hy-Flo Super Cel. Benzoquinone was purified by sublimation. Methanol was Baker Analyzed reagent spectrophotometric grade. Dimethylformamide was purified by distillation from calcium hydride under vacuum.

In this study, the solutions were irradiated with a 500-M projection lamp setup consisting of a collimating lens, a Corning CS3-69 filter, a 1-cm heat filter of 0.05 percent copper sulfate, and a 7 cm filter of distilled water. The light intensity was $3.5 \times 10^4$ erg/cm$^2$-sec.

The epr spectra were obtained with a Varian V-4502 spectrometer utilizing 100kc modulation. The samples were irradiated with light from a 1-kW projection lamp. The light was passed through a 1-cm heat filter of 0.05 percent copper sulfate and the CS3-69 filter.

The test solutions were prepared at the time of determination. Air-free systems were obtained by flushing with nitrogen which was previously scrubbed with either alkaline pyrogallol or chromous chloride solutions. Methanol was used directly for systems studied in the presence of air.

Porton ejection accompanying electron transfer for the ZnTPP-benzoquinone system in methanol is illustrated by the typical results shown in FIG. 4. Similar observations were also noted in aqueous dimethylformamide solutions. FIG. 4 shows that no change in apparent pH is observed when either Zn TPP or quinone is irradiated with yellow light.

From a consideration of the foregoing, it can be seen that the present invention provides a sensitive radiometer that can be constructed at low cost and is sensitive over a wide range of wavelengths from the visible to infrared. It operates on the principle that when a solvent solution of a porphyrin and a quinone is irradiated with light, protons are ejected to the surrounding media. The number of protons ejected is proportional to the light intensity. Therefore, combining a conventional pH meter with a light sensitive solution provides an efficient and sensitive radiometer for detecting and measuring radiant electromagnetic energy.

While the principle of this invention has been described with particularity, it should be understood that various alterations and modifications can be made without departing from the spirit of the invention the scope of which is defined by the appended claims.

What is claimed is:

1. A system for detecting and measuring radiant electromagnetic energy comprising a means containing a light sensitive solution composed of a solvent mixture of a porphyrin and a quinone and a means for measuring pH including a glass electrode positioned within and in contact with said light sensitive solution.

2. A system in accordance with claim 1 wherein said light sensitive solution is composed of a mixture of chlorophyl and hydroquinone dissolved in methanol.

3. A system in accordance with claim 1 wherein said light sensitive solution is composed of a mixture of chlorophyl and benzoquininone dissolved in methanol.

4. A system in accordance with claim 1 wherein said light sensitive solution is composed of a mixture of zinc tetraphenylporphin and benzoquinone disolved in methanol.

* * * * *